United States Patent

[11] 3,603,888

[72] Inventor Dallas W. Jones
 Annandale, Va.
[21] Appl. No. 802,081
[22] Filed Feb. 25, 1969
[45] Patented Sept. 7, 1971
[73] Assignee The United States of America as
 represented by the Secretary of the Navy

[54] PULSE ANALYZER
 4 Claims, 2 Drawing Figs.

[52] U.S. Cl.................................................. 328/112,
 328/114, 328/127, 328/116
[51] Int. Cl.............................................. G03k 5/20
[50] Field of Search........................................... 328/110,
 112, 115, 116

[56] References Cited
 UNITED STATES PATENTS
2,557,636 6/1951 Crumrine..................... 328/115
2,636,118 4/1953 Smaller........................ 328/110
2,638,273 5/1953 Jensen......................... 328/115
3,028,553 4/1962 Richter........................ 328/115
3,274,514 9/1966 Foulger........................ 328/112
3,345,575 10/1967 Van Der Lans................ 328/110

*Primary Examiner*—Donald D. Forrer
*Assistant Examiner*—Harold A. Dixon
*Attorneys*—A. L. Branning and R. S. Sciascia ABSTRACT: A pulse analyzer comprising an integrating amplifier having its input coupled in common with the input of a stretching amplifier. The outputs of the amplifiers are coupled to respective inputs of a differential amplifier having its output coupled to a steering gate which separates positive and negative pulses for further processing by wave shaping circuits. The analyzer separates input pulses which deliver a large total charge from those which deliver a small total charge for the same initial peak current.

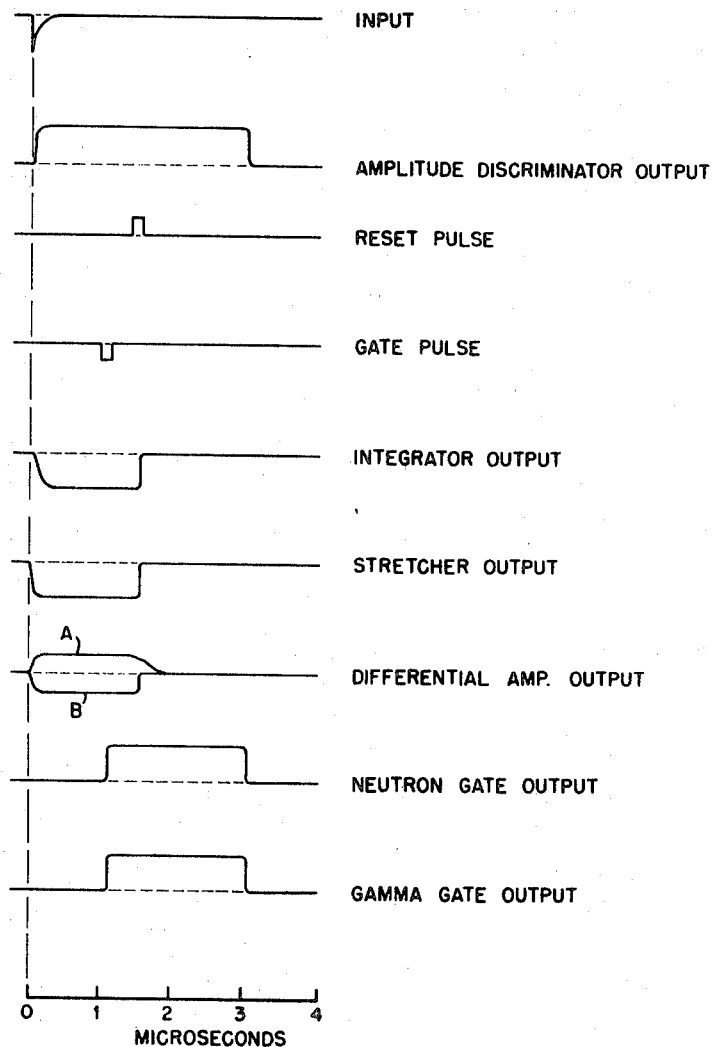

3,603,888

PULSE ANALYZER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Pulse analyzers for comparing and segregating pulses having different characteristic waveforms have been used extensively in connection with organic scintillation detectors. In such devices, it is necessary, for example, to separate signals produced by neutrons from those produced by gammas. Wave shape analyzers performing such functions have been based primarily on the principle that the two different signals will have differing pulse decay-time characteristics.

Many varied circuit approaches have been taken in the past to embody such a waveshape discrimination principle; however, they have not proven satisfactory for all applications and under all conditions of operation and have hindered basic research efforts which depend upon accurate identification of the sources of various scintillations.

SUMMARY OF THE INVENTION

Accordingly, it is one object of the present invention to provide a pulse waveform analyzer having all the advantages of similarly employed prior art devices and further providing increased versatility in all applications and increased reliability.

A further object of this invention is the provision of a pulse analyzer for segregating pulses on the basis of the area under their waveforms.

It is a still further object of this invention to provide a reliable, accurate pulse analyzer which effectively provides pulse shape discrimination.

Yet another object of the present invention is to provide a pulse analyzer which provides a uniformly shaped output signal for each of various input pulses identified.

The invention is summarized in that a pulse analyzer for differentiating between input pulses having first and second characteristics comprises a circuit for integrating and amplifying the input pulses to provide an integrated signal, a circuit for integrating and amplifying a first portion of each of the input pulses to provide a stretched signal, and a differential amplifier coupled to the aforementioned circuits for subtracting the integrated signal from the stretched signal to provide an output signal having a positive when the input pulses have the first characteristic and a negative polarity when the input pulses have the second characteristic.

One advantage of this invention is that it can be efficiently operated even when separated from its input source by a considerable length of coaxial cable.

Other objects, advantages and novel features of this invention will become more apparent from the following detailed description of the invention when considered in conjunction with the accompanying drawings.

BRIEF DESCRIPTION OF THE DRAWINGS

FIG. 2 shows a series of typical waveforms appearing at various points in the circuit of FIG. 1.

DESCRIPTION OF THE PREFERRED EMBODIMENT

Figure 1:
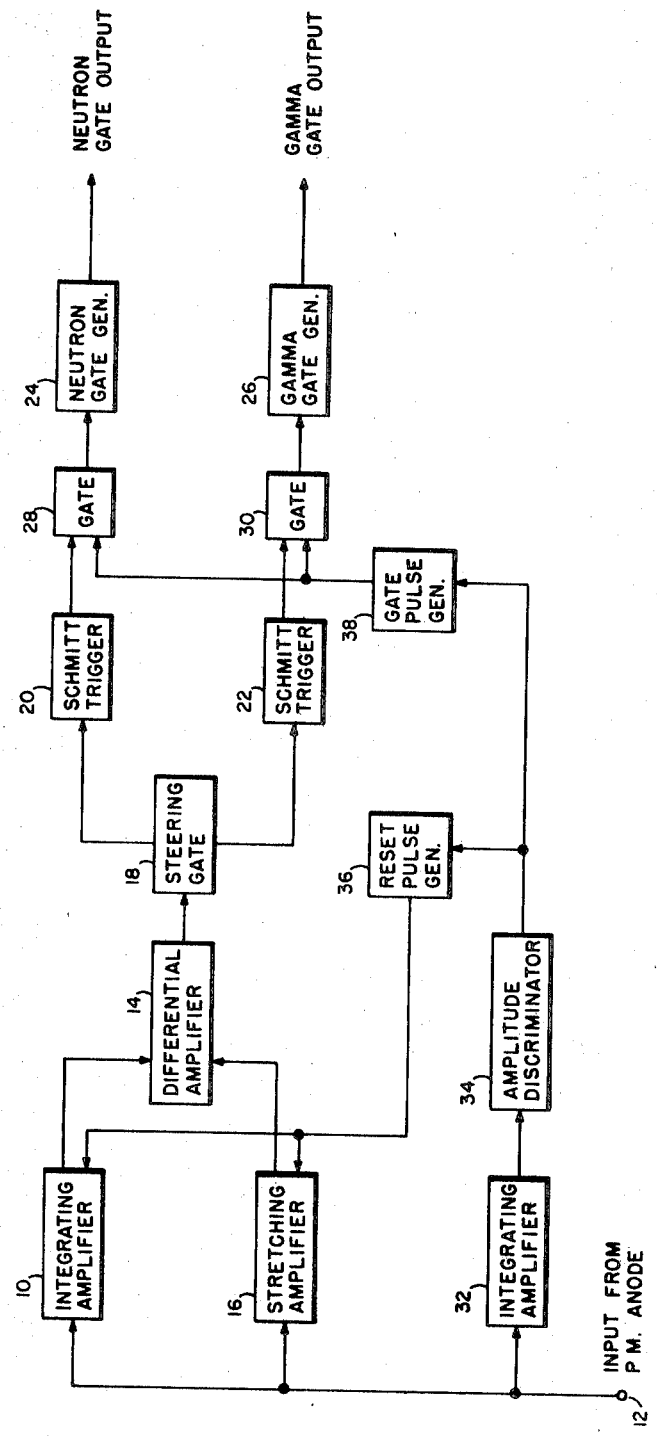
FIG. 1 shows a block diagram of the preferred embodiment of the invention.

FIG. 1, which illustrates the preferred embodiment of the invention, shows an integrating amplifier 10 having an input coupled to the anode of a photomultiplier tube, shown schematically as terminal 12, and an output coupled to one input of differential amplifier 14. A stretching amplifier 16, the operation of which will be described below, is coupled between the anode 12 and the other input of differential amplifier 14. The output of differential amplifier 14 is coupled to a steering gate 18 which directs signals having one polarity to Schmitt trigger 20 and signals having the opposite polarity to Schmitt trigger 22. The outputs from trigger circuits 20 and 22 are fed to neutron gate generator 24 and gamma gate generator 26, respectively, via gate circuits 28 and 30.

The invention further includes a reset feature provided by integrating amplifier 32 which is coupled between the photomultiplier anode 12 and an amplitude discriminator 34. The output of amplitude discriminator 34 is fed to a reset pulse generator 36 and a gate pulse generator 38. The duration of the amplitude discriminator output pulse determines a dead time during which the analyzer will not identify a second pulse. It is noted that the amplitude discriminator output could also be fed to an oscilloscope unblanking pulse generator (not shown) for monitoring purposes. The output of reset pulse generator 36 is coupled to both the integrating amplifier 10 and the stretching amplifier 16 to reset the output signals appearing thereon to zero. Resetting these pulses to zero reduces the dead time of the discriminator and eliminates the necessity of precisely balancing the long decay times of the integrator and stretcher. In a similar manner, the output of gate pulse generator 38 is coupled to gate circuits 28 and 30 to define the time at which the output of the Schmitt triggers, and therefore the differential amplifier, are inspected. Upon receipt of the gate pulse generator output signal, the output pulses from the Schmitt triggers are allowed to pass through their respective logic gates to enable gate generators 24 and 26.

The operation of the circuit of FIG. 1 will be described with reference to its application in a neutron-gamma pulse discrimination system; however, it is to be understood of course, that this is only one exemplary application and other uses are contemplated.

In such systems, a photomultiplier tube is utilized to provide output pulses for further processing when neutron or gamma induced scintillations are taking place. The photomultiplier converts the light from the system scintillator into a voltage pulse appearing at its anode. Such a pulse is illustrated as the input pulse in FIG. 2. The voltage input pulse appearing on the anode 12 is fed to the pulse analyzer where it is coupled simultaneously to the inputs of a first integrating amplifier 10 and a stretching amplifier 16. The voltage pulse is electronically integrated with a long time constant in the integrating amplifier 10 to obtain an output pulse which is proportional to the total delivered charge. This output pulse is shown as the integrator output in FIG. 2. In the stretching amplifier 16, the voltage pulse is stretched by integrating only the first portion of the input pulse to provide an output pulse, labeled stretcher output in FIG. 2, whose amplitude is proportional to the peak amplitude of the pulse from the photomultiplier. The output pulse from the integrating amplifier 10 and stretching amplifier 16 are reset to zero after 1.5 microseconds by the reset pulse from reset pulse generator 36. Resetting these pulses to zero eliminates the necessity of balancing the long decay times of the integrator 10 and stretcher 16 and reduces the dead time of the discriminator.

The outputs from these two amplifiers are then compared in a differential amplifier 14. Because the ratio of the total charge to the peak amplitude is greater for a pulse induced by a neutron than by a gamma, the gain of the integrating amplifier 10 can be adjusted to produce outputs of opposite polarity for neutron and gamma scintillations, as shown by positive curve A and negative curve B in FIG. 2. The output of the differential amplifier 14 is then fed to a steering gate 18 which feeds pulses of one polarity to the upper channel and pulses of the opposite polarity to the lower channel. Both channels are identical and include a Schmitt trigger circuit for producing an output pulse whenever its corresponding input is above the trigger threshold level. The trigger output pulse is fed via a logic gate to a monostable multivibrator, acting as a neutron or a gamma gate pulse generator, to produce a uniform pulse, shown by neutron gate output and gamma gate output pulses in FIG. 2. The gate pulse generator is triggered by the Schmitt trigger only during the time interval in which the gate pulse, shown in FIG. 2, is applied to the gate circuit of that channel. Gating the Schmitt trigger circuit outputs precisely defines the time at which the gate pulses, identifying neutrons and gammas, appear and prevents overshoots at the beginning and end of the differential amplifier output from triggering the pulse generators thus reducing the effect of a mismatch in rise time and reset times. The output pulses can be used to identify neutrons and gammas and can be fed to any desired readout or processing circuitry.

It is additionally noted that integrating amplifier 32 and amplitude discriminator 34 cooperate to produce the amplitude discriminator output pulse shown in FIG. 2 which enables reset pulse generator 36 to produce the reset pulse after 1.5 microseconds, and gate pulse generator 38 to produce the gate pulse after 1 microsecond.

Thus, there is shown a reliable circuit, which can be contained in a module of standard dimensions, for accurately discriminating between neutron and gamma pulses to produce output signals having a uniform waveform for utilization in various systems.

It should be understood, of course, that the foregoing disclosure relates to only a preferred embodiment of the invention and that numerous modifications or alterations may be made therein in light of the above teachings.

What is claimed and desired to be secured by Letters Patent of the United States is:

1. In a pulse analyzer for differentiating between input pulses having first and second characteristics, a combination comprising:
   first means for integrating and amplifying said input pulses to provide an integrated signal;
   second means for integrating and amplifying a first portion of each of said input pulses to provide a stretched signal;
   a differential amplifier coupled to said first and second means for subtracting said integrated signal from said stretched signal to provide an output signal having a positive polarity when said input pulses have said first characteristic and a negative polarity when said pulses have said second characteristic;
   steering means coupled to said differential amplifier for providing a first signal on a first output when said differential amplifier output is positive and a second signal on a second output when said differential amplifier output is negative;
   first wave shaping means coupled to the first output of said steering means for processing said first signal to provide a first uniform output; and
   second wave shaping means coupled to the second output of said steering means for processing said second signal to provide a second uniform output.

2. The invention as recited in claim 1, wherein said first and second wave shaping means each include:
   a Schmitt trigger coupled to said differential amplifier; and
   a square-wave pulse generator coupled to said Schmitt trigger.

3. The invention as recited in claim 2, further including;
   reset means coupled to said means for integrating said input pulses, said means for integrating a first portion of said input pulses, and said first and second wave shaping means for resetting the combination a predetermined time after an input pulse is received thereby.

4. The invention as recited in claim 3, wherein said reset means includes:
   an integrating amplifier adapted to receive said input pulses;
   an amplitude discriminator coupled to said integrating amplifier for providing an output signal when the output from said integrating amplifier is above a predetermined value;
   a reset pulse generator coupled to said amplitude discriminator, said means for integrating said input pulses, and said means for integrating a first portion of said input pulses; and
   a gate pulse generator coupled to said amplitude discriminator, said first wave shaping means, and said second wave shaping means.